United States Patent [19]

Chen et al.

[11] Patent Number: 5,677,788

[45] Date of Patent: Oct. 14, 1997

[54] TWO-STAGE PROJECTION SYSTEM

[75] Inventors: Chungte W. Chen, Irvine, Calif.; James D. Zimmerman, Reston; David A. Ansley, Sterling, both of Va.

[73] Assignee: Hughes Electronics, Los Angeles, Calif.

[21] Appl. No.: 623,493

[22] Filed: Mar. 28, 1996

[51] Int. Cl.$^6$ ................................................ G02B 17/00
[52] U.S. Cl. .................... 359/365; 359/366; 359/730; 359/858; 359/859
[58] Field of Search ................................. 359/364, 365, 359/366, 434, 629, 631, 634, 638, 727, 728, 729, 730, 731, 858, 859, 861

[56] References Cited

U.S. PATENT DOCUMENTS

| | | | |
|---|---|---|---|
| 3,620,592 | 11/1971 | Freeman | 359/727 |
| 4,687,301 | 8/1987 | Ledebuhr | 359/634 |
| 4,842,374 | 6/1989 | Ledebuhr | 359/634 |
| 4,950,056 | 8/1990 | Smith | 359/859 |
| 5,257,133 | 10/1993 | Chen et al. | 359/565 |

*Primary Examiner*—Paul M. Dzierzynski
*Assistant Examiner*—Mark Robinson
*Attorney, Agent, or Firm*—Michael W. Sales; Wanda K. Denson-Low

[57] ABSTRACT

A high efficiency, high performance full color projection system. The system includes a one-to-one relay and a refractive projection lens system. The one-to-one relay combines the outputs from two different spectral image sources, such as blue and red image sources. The refractive projection lens further combines the output from a third spectral image source, such as a green image source, with the combined images from the other two image sources relayed through the one-to-one relay to produce a single output. The one-to-one relay includes three modules, a spherical primary module, a spherical secondary module and a spectral combining module. The refractive projection lens system includes a beam combiner and a projection optics.

26 Claims, 6 Drawing Sheets

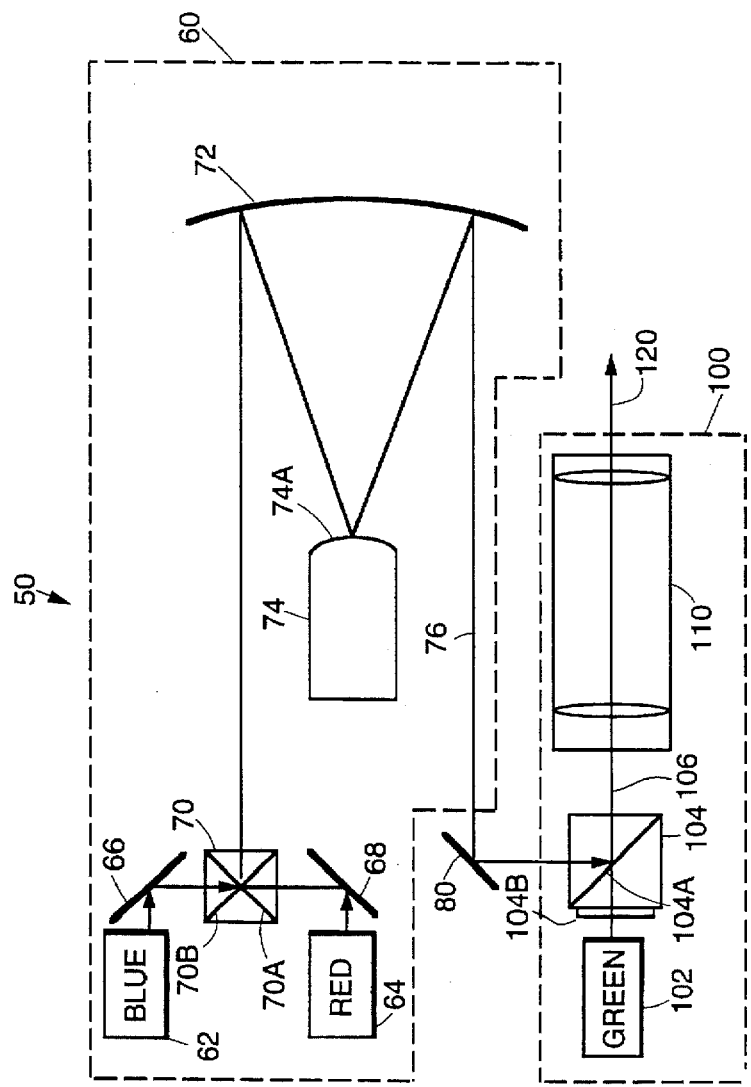
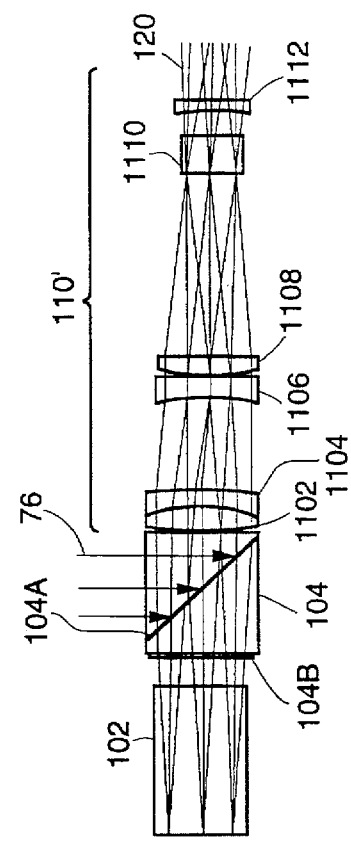
FIG. 1.
FIG. 3.

TWO-STAGE PROJECTION SYSTEM

TECHNICAL FIELD OF THE INVENTION

This invention relates to full color projection systems, and more particularly to high efficiency, high performance systems including a one-to-one relay and a refractive projection lens system.

BACKGROUND OF THE INVENTION

Convention full color projection systems include three projectors. Each spectral image (i.e. red, green and blue) is projected by its own projector. The final color image is converged at the projection screen.

These conventional full color projection systems have several disadvantages. One disadvantage is that the three different spectral images are never truly aligned at the screen. Other disadvantages include very tight tolerance margins, bulkiness, difficulty in alignment, high cost and difficulty in providing an external exit pupil. Moreover, with three different optical axis associated with three projectors, it is almost impossible to have zoom capability and an external pupil, and very difficult to obtain an on screen convergence on a non-flat, curved screen.

The disadvantages associated with the three-projector system can be overcome through the teachings of the present invention.

SUMMARY OF THE INVENTION

The purpose of this invention is to greatly simplify a very high brightness, high performance projection system. A system constructed according to the invention has a single output. Therefore, the color convergence is easy to control and the image is very sharp. Additionally, the system is suitable for implementation of a zoom configuration with external exit pupil to further enhance application versatility.

In a general sense, an exemplary embodiment of the invention is a two-stage full color, image combining projection system, comprising a one-to-one relay system for combining radiation from long and short spectral band image sources, e.g. blue and red, and a combining projector. The relay system includes a spectral combining module to combine the radiation from the long and short spectral band image sources, a spherical primary module and a secondary spherical module. The combining projector includes a beam combiner and a projection optics system.

The spherical primary module reflects the combined radiation from the spectral combining module onto the spherical secondary module. This combined radiation in turn reflects off the secondary module back onto the primary module, the primary module in turn focussing the combined radiation reflected off the secondary module at the beam combiner. The beam combiner combines the combined radiation from the spectral combining module with radiation from a third image source providing radiation in a band, e.g. green, intermediate the long and short bands to provide a full color combined image.

The preferred embodiment of the spectral combining module includes an X-prism. The spherical primary module includes a spherical mirror.

In accordance with a further aspect of the invention, the spherical secondary module includes a convex mirror and an axial chromatic correction element for compensating chromatic aberration introduced by the spectral combining module.

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 is an optical schematic diagram of a two-stage image combining projection system embodying the invention.

FIG. 3 is an optical schematic of a first embodiment of the second stage of the projection system of FIG. 1, the second stage including a refractive projector with a polarization beam splitter cube.

DETAILED DESCRIPTION OF THE PREFERRED EMBODIMENT

Figure 2A:
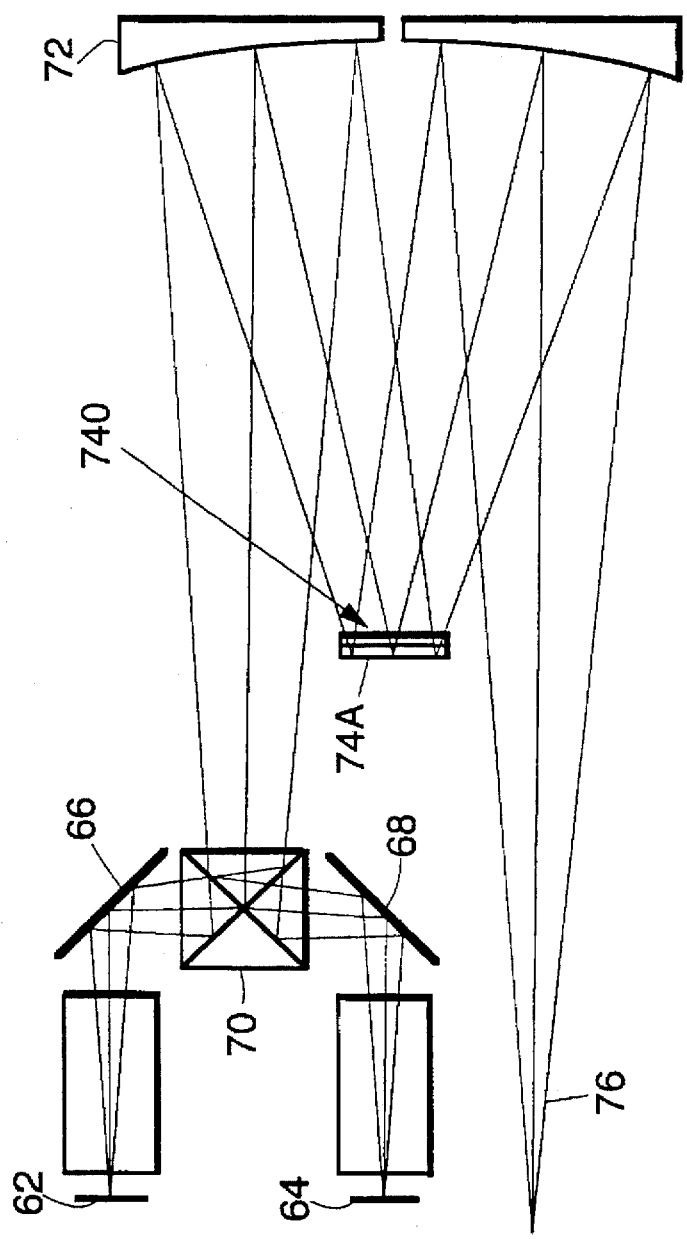
FIG. 2a is a schematic diagram of a first embodiment the relay including a zero power doublet.

FIG. 1 is a simplified optical schematic diagram of a two-staging image combining projector 50 in accordance with the invention, wherein the first stage 60 includes an improved Offner's one-to-one relay system, and the second stage 100 is a beam combining projector. The radiation from color 1 and 2 image sources 62 and 64 (such as blue and red liquid crystal light valves (LCLV) are first reflected by mirrors 66 and 68 onto and combined through an X-prism 70. The prism 70 has beam splitting surfaces 70A and 70B respectively coated with band pass filters. The coated surface 70B reflects the blue radiation and transmits the red radiation, and the surface 70A reflects the red radiation and transmits the blue radiation. The combined images are then reflected off the primary spherical mirror 72 and directed to secondary assembly 74, and finally focused by the primary mirror 72 again to form a one-to-one relayed two-color image indicated generally as beam 76, which is directed by mirror 80 into the second stage 100. The projector 50 forms an identically sized and inverted image of the combined blue and red image sources, and is therefore called a one-to-one relay.

In the second stage 100, the two-color image 76 is further combined with the radiation from color 3 image source 102, e.g. a green LCLV, through a polarization beam splitter cube 104 located between the third image source 102 and the refractive projector 110. Finally, the combined 3-color radiation indicated as beam 106 is projected out through the refractive projector 110 as the output beam indicated as beam 120.

The advantages associated with a two-staging image combining projector in accordance with the invention include (i) very high brightness as a result of high combining efficiency, (ii).a very long back focal distance in the one-to-one relay module makes the package very flexible, (iii) capability of implementing a zoom function, which is necessary in many application, and (iv) a capability of external exit pupil makes the projector very versatile for interfacing other optical modules.

A conventional Offner relay consists of only the primary and the secondary mirrors. The incorporation of the X-prism in the optical system in accordance with the invention introduces spherical and chromatic aberrations which the conventional Offner relay would be unable to correct.

The one-to-one relay 60 includes three modules, a spherical primary 72, a spherical secondary module 74, and a spectral combining module 70. In comparison to conventional Offner designs, the present invention provides additional capabilities.

1) Spectral Combining Module 70.

An X-prism 70, the preferred embodiment, combines the radiation for both the long and short spectral bands, i.e. the red and blue spectral bands. Although capable of merging radiation from three different LCLVs as described below with respect to FIG. 6, an X-prism combining only the long and short spectral band radiation reflected off the hypotenuses 70A and 70B of the X-prism 70 has much better efficiency.

2) Secondary assembly 74.

Figure 2B:
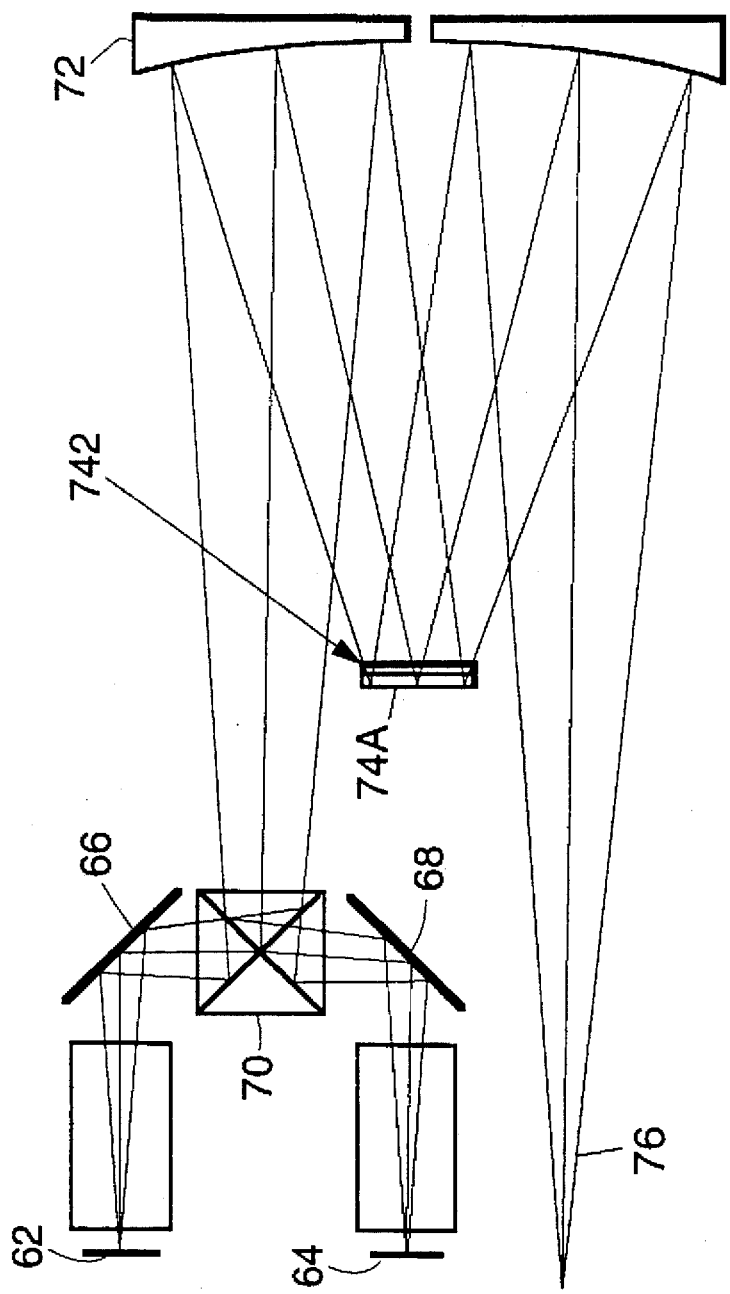
FIG. 2b is a schematic diagram of a second embodiment of the one-to-one relay comprising the system of FIG. 1, the relay including a diffraction optical element.

The secondary assembly 74 includes a convex mirror 74A and an axial chromatic correction element such as a zero power doublet 740 shown in FIG. 2a, in front of the secondary mirror 74A, or a diffractive optical element (DOE) 742 shown in simplified schematic form in FIG. 2b on the mirror 74A. This additional chromatic aberration correction mechanism is very important for compensating the chromatic aberration introduced by the beam combining X-prism 70.

The zero power doublet 740 comprises one lens with high Abbe number (such as BK7, SK16) and one lens with low Abbe number (such as F2, SF11). While maintaining zero total optical power, various amounts of the chromatic aberration can be generated by varying the optical power of each lens. For instance, the chromatic aberration of a SK16-F2 zero power doublet with a 1.0 and −1.0 optical power for the SK16 and F2 lenses, respectively, is different from that of a 0.9 and −0.9 optical power of the Sk16F2 doublet.

The chromatic aberration can also be corrected by a DOE 742 (FIG. 2b) with a very small amount of diffractive power. The structure of a DOE suitable for the purpose is shown in FIG. 3 of commonly assigned U.S. Pat. 5,257,133, entitled RE-IMAGING OPTICAL SYSTEM EMPLOYING REFRACTIVE AND DIFFRACTIVE OPTICAL ELEMENTS.

3) Combining Projector 100.

The second stage combining projector 100 includes a beam combiner 104 and a projection optics system 110. A polarization beam combiner is preferred as the beam combiner 104 for LCLV image sources due to its better combining efficiency. A polarization beam combiner is generally arranged in such a way that the S-polarization radiation is reflected off the beam combining surface 104A and the P-polarization is transmitted through the beam combining surface. The phase of the combined blue and red image from the one-to-one relay is a function of the projection image brightness. To display a bright red or blue pixel on the screen, the phase of the corresponding radiation of the combined image is S-polarized so that it is totally reflected off the beam combining surface 104A. Similarly, the phase of the corresponding radiation of a dark image pixel is P-polarized. Therefore, it is totally transmitted through the polarization beam combiner surface 104A. The gray level of the image is obtained by rotating the phase of the radiation between the S and the P polarization. An LCLV is the preferred mechanism for rotating the phase of the radiation.

For the green channel, a half-wave plate 104B in front of the polarization beam combiner 104 rotates the radiation by 90 degrees. Therefore, the S-polarization from the green LCLV source 102 is rotated to P-polarization by plate 104B and totally transmitted through the polarization cube 104.

The projection optics system 110 can be refractive or reflective, with either fixed focal length (FFL) or variable focal length (VFL). FIG. 3 illustrates a typical example of a FFL refractive projector 110A, which includes optical elements 1102-1112. To achieve the highest contrast ratio for the projected image, the projector has to be telecentric (i.e. the principle rays are parallel to the optical axis) in the LCLV space. The back focal distance of the projector has also to be long enough to accommodate the physical sizes of the LCLV module 102 and the polarization combining cube 104. The doublets 1102-1104 and 1106-1108 perform these two functions, i.e. providing the telecentric and the long back focal distance. The optical power of the entire projector is mainly provided by these two doublets. The doublet 1110-1112 compensates the chromatic aberration generated by the polarization beam combiner and the doublets 1102-1104 and 1106-1108. In this particular configuration, the output combined image 120 is afocal (the image is focused ad infinite, i.e. the output beam is collimated) and ready for coupling with fore optics (the optics in front of the rest of the optical system). In many application, the refractive projector can be finite conjugate for projecting the image on a screen; i.e. the object and image position are not located at infinite. Usually, if the object or image distance is larger than ten times the focal length of the system, the object or image is considered to be at infinity. So, the projector 110A is an afocal system in the projection space.

Figure 4:
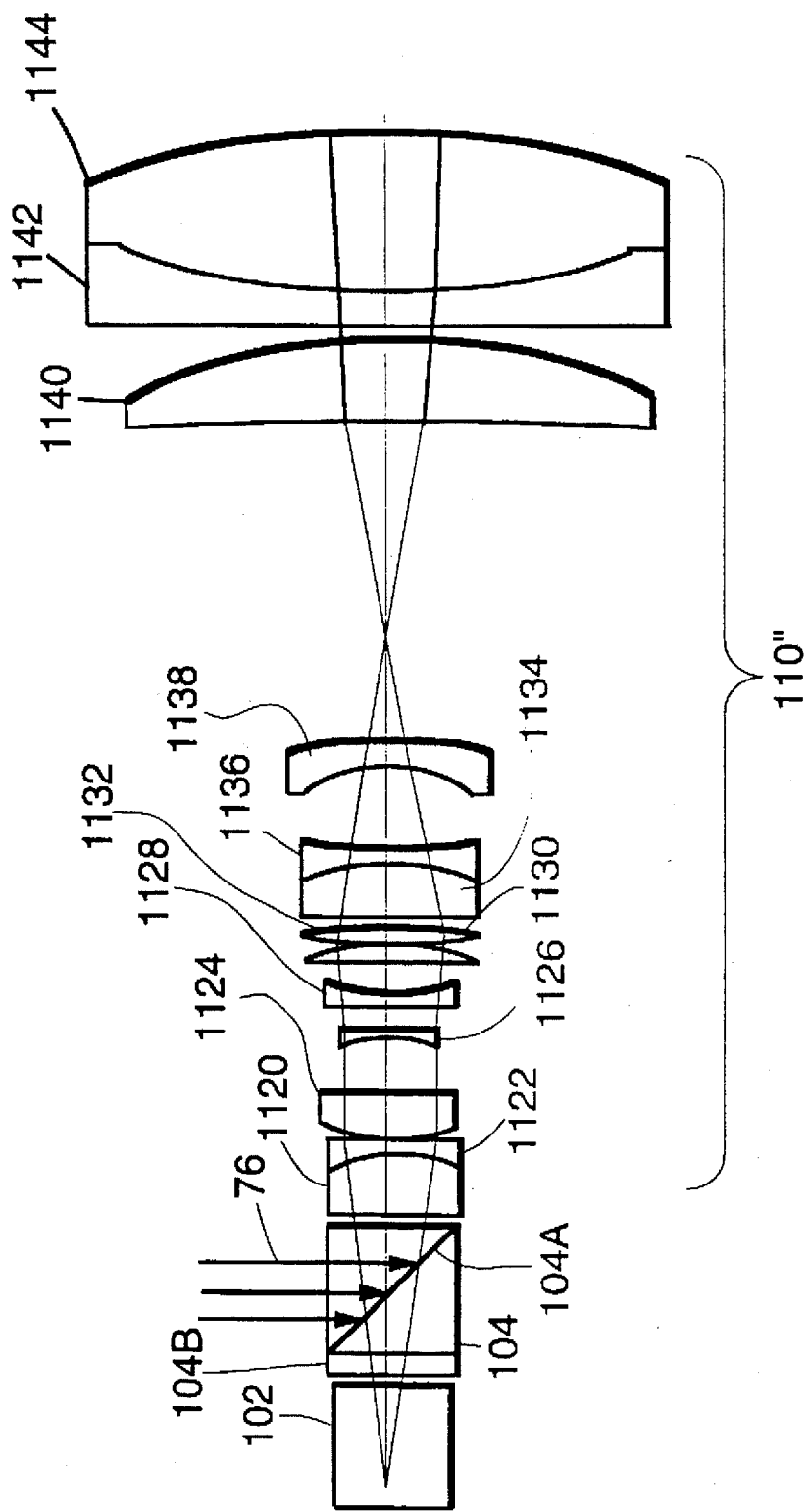
FIG. 4 is an optical schematic of a second embodiment of the second stage of the projection system of FIG. 1, the second stage including a zoom projector with a polarization beam splitter cube.

FIG. 4 shows a typical example of a VFL refractive projector 110B, which includes optical elements 1120-1144. The VFL projector has four lens groups, the prime group (lens 1120-1126), the compensator group (1128-1132), the variator group (1134-1138), and the collimator group (1140-1144). The variator is the key group providing most of the zooming capability. When moving the variator for zooming, the compensator provides for the focus compensation such that the image remains sharp. The combination of the prime, compensator and variator relays the combined images (i.e. the blue, green and red images) to where the collimator can project the combined image onto the screen. This capability is particularly important for many simulator and commercial applications.

Figure 5:
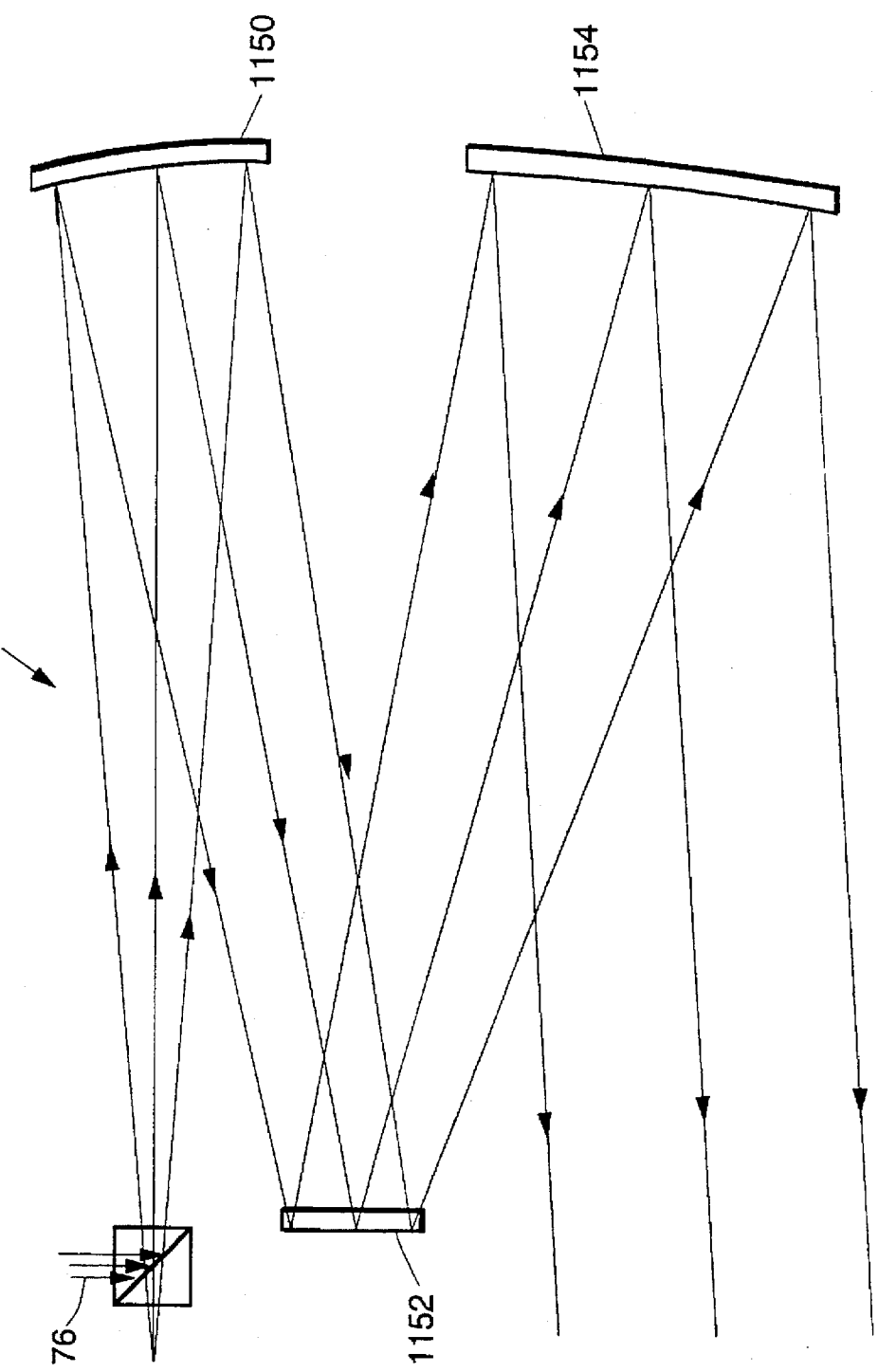
FIG. 5 is an optical. schematic of a second embodiment of the second stage of the projection system of FIG. 1, the second stage including a reflective projector with a polarization beam splitter cube.

FIG. 5 shows an exemplary FFL reflective projector 110C, comprising mirrors 1150, 1152 and 1154. The three mirror projector is similar in operation to a three mirror telescope with the combined image coinciding with the image plane of the telescope. The advantage associated with the reflective projector 110C is its freedom from chromatic aberration. The projector can therefore project both visible and IR images. When a projector is required for operating in a very wide spectral range, a reflective projector makes the system very simple. The potential applications include a near infrared simulator for night vision goggle applications or an infrared simulator operating at the infrared spectral range. In this case, the image sources 62, 64 and 102 could operate, for example, respectively at 0.75 micron, 0.85 micron and 1.06 micron.

Figure 6:
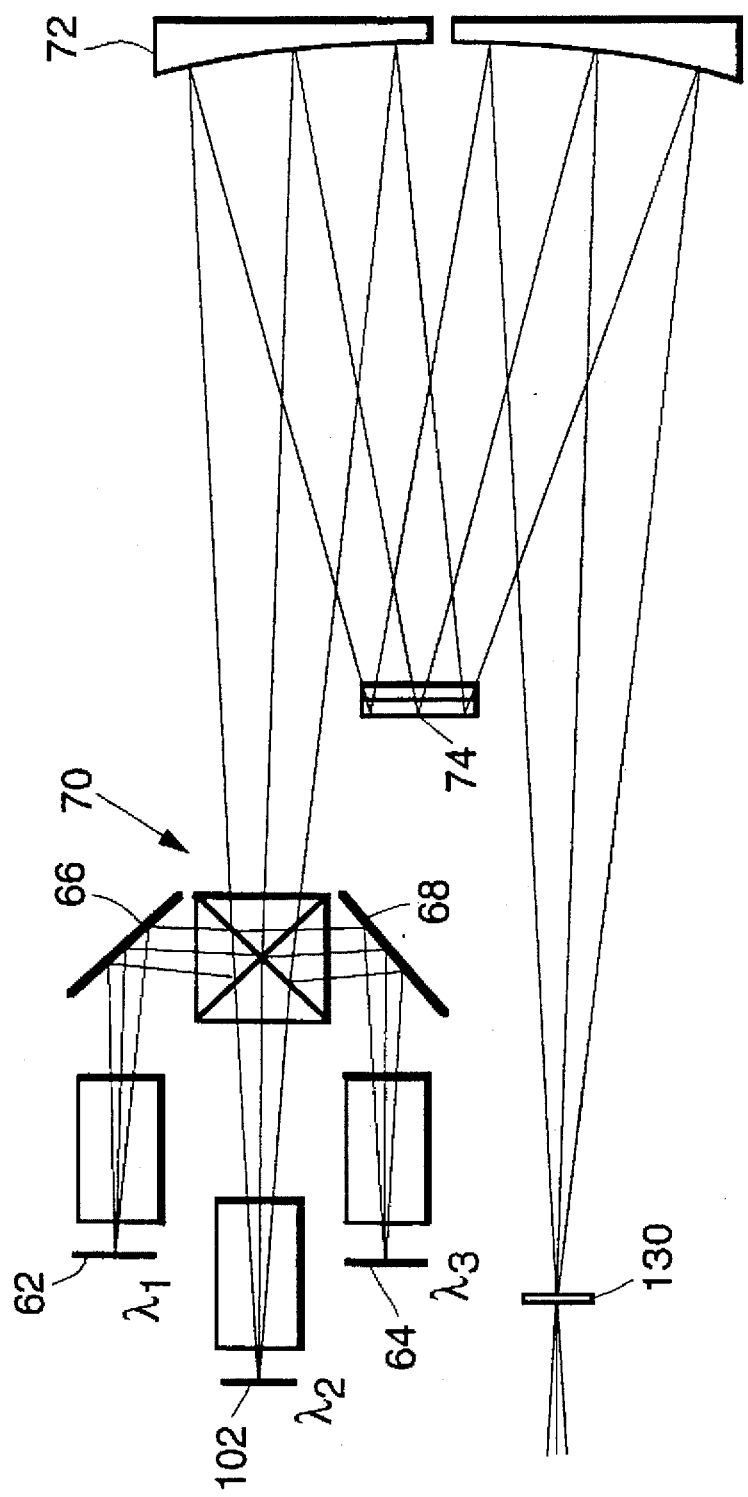
FIG. 6 is an optical schematic of a further alternate embodiment, wherein an X-prism directly combines radiation from the red, blue and green image sources.

FIG. 6 shows a further alternate embodiment of a projection system embodying aspects of the invention. In this embodiment, the X-prism 70 combines the red, blue and green image radiation from respective sources 62, 64 and 102. While this embodiment does not provide the same high combining efficiency as the embodiment of FIG. 1, it also is somewhat simpler, since a polarization beam splitter cube 104 is not needed. This embodiment also employs the primary mirror 72 and the secondary assembly 74 as in the embodiment of FIG. 1. The combined radiation is focused at a reticle 130, and may be passed through projection optics similar to optics 110, if need for the particular application.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A two-stage image combining projection system, comprising:
   a one-to-one relay system for combining radiation from first and second spectral band image sources, said relay system including a spectral combining module to combine the radiation from said first and second spectral band image sources, a spherical primary module and a secondary spherical module;
   a combining projector comprising a beam combiner and a projection optics system;
   wherein the spherical primary module reflects the combined radiation from the spectral combining module onto the spherical secondary module, this combined radiation in turn reflected off the secondary module back onto the primary module, the primary module in turn focussing the combined radiation reflected off the secondary module at the beam combiner; and
   wherein the beam combiner combines the combined radiation from the spectral combining module with radiation from a third image source providing radiation in a third spectral band to provide a single combined image.

2. The projection system of claim 1 wherein the spectral combining module includes an X-prism.

3. The projection system of claim 1 wherein the spherical primary module includes a spherical mirror.

4. The projection system of claim 1 wherein the spherical secondary module includes a convex mirror and an axial chromatic correction element for compensating chromatic aberration introduced by the spectral combining module.

5. The projection system of claim 4 wherein the axial chromatic correction element includes a zero power doublet.

6. The projection system of claim 4 wherein the axial chromatic correction element includes a diffractive optical element.

7. The projection system of claim 1 wherein the beam combiner is a polarization beam combiner.

8. The projection system of claim 7 wherein the polarization beam combiner includes a polarization beam splitter cube.

9. The projection system of claim 1 wherein the projection optics system includes a refractive projector.

10. The projection system of claim 9 wherein the refractive projector has a fixed focal length.

11. The projection system of claim 9 wherein the refractive projector has a variable focal length.

12. The projection system of claim 1 wherein the projection optics system includes a reflective projector.

13. The projection system of claim 1 wherein the projection optics system includes a zoom projector to project the combined image from the beam combiner with a variable magnification capability.

14. The projection system of claim 1 wherein said first image source is a red image source, said second image source is a blue image source, and said third image source is a green image source.

15. A two-stage image combining projection system, comprising:
   a one-to-one relay system for combining radiation from long and short spectral band image sources, said relay system including a spectral combining module to combine the radiation from said long and short spectral band image sources, a spherical primary module and a secondary spherical module, said spectral combining module including an X-prism;
   a combining projector comprising a beam combiner and a projection optics system;
   wherein the spherical primary module reflects the combined radiation from the spectral combining module onto the spherical secondary module, this combined radiation in turn reflected off the secondary module back onto the primary module, the primary module in turn focussing the combined radiation reflected off the secondary module at the beam combiner; and
   wherein the beam combiner combines the combined radiation from the spectral combining module with radiation from a third image source providing radiation in a third spectral band intermediate said long and short bands to provide a single combined image.

16. The projection system of claim 15 wherein said long band image source is a red image source, said short band image source is a blue image source, and said third image source provides green radiation.

17. The projection system of claim 15 wherein the spherical primary module includes a spherical mirror.

18. The projection system of claim 15 wherein the spherical secondary module includes a convex mirror and an axial chromatic correction element for compensating chromatic aberration introduced by the spectral combining module.

19. The projection system of claim 18 wherein the axial chromatic correction element includes a zero power doublet.

20. The projection system of claim 18 wherein the axial chromatic correction element includes a diffractive optical element.

21. The projection system of claim 15 wherein the respective long and short band image sources and the third image source respectively include liquid crystal light valves, and said beam combiner is a polarization beam combiner.

22. The projection system of claim 21 wherein the polarization beam combiner includes a polarization beam splitter cube.

23. A one-to-one relay system for combining radiation from first, second and third spectral band image sources, said relay system including:
   a spectral combining module to combine the radiation from said first, second and third spectral band image sources;
   a spherical primary module; and
   a secondary spherical module including a convex mirror and an axial chromatic correction element for compensating chromatic aberration introduced by the spectral combining module;
   wherein the spherical primary module reflects the combined radiation from the spectral combining module onto the spherical secondary module, this combined radiation in turn reflected off the secondary module back onto the primary module, the primary module in turn focussing the combined radiation reflected off the secondary module.

24. The relay system of claim 23 wherein the spectral combining module includes an X-prism.

25. The relay system of claim 23 wherein the axial chromatic correction element includes a zero power doublet.

26. The relay system of claim 23 wherein the axial chromatic correction element includes a diffractive optical element.

* * * * *